(12) United States Patent
Lee et al.

(10) Patent No.: US 12,332,219 B2
(45) Date of Patent: Jun. 17, 2025

(54) SAMPLE STRETCH TEST DEVICE AND SAMPLE STRECH TEST SYSTEM INCLUDING SAME

(71) Applicant: FlexiGO INC., Cheonan-si (KR)

(72) Inventors: Ki Yong Lee, Cheonan-si (KR); Dong Gun Shin, Cheonan-si (KR); Tae Wan Kim, Cheonan-si (KR)

(73) Assignee: FlexiGO INC., Cheonan-si (KR)

( * ) Notice: Subject to any disclaimer, the term of this patent is extended or adjusted under 35 U.S.C. 154(b) by 343 days.

(21) Appl. No.: 17/893,459

(22) Filed: Aug. 23, 2022

(65) Prior Publication Data

US 2023/0236096 A1 Jul. 27, 2023

(30) Foreign Application Priority Data

Jan. 27, 2022 (KR) .................. 10-2022-0012125

(51) Int. Cl.
  *G01N 3/08* (2006.01)
  *G01N 3/02* (2006.01)
(52) U.S. Cl.
  CPC .............. *G01N 3/08* (2013.01); *G01N 3/02* (2013.01)
(58) Field of Classification Search
  CPC ........................................... G01N 3/08
  See application file for complete search history.

(56) References Cited

U.S. PATENT DOCUMENTS

| 6,467,357 B1 * | 10/2002 | Pe ........................... G01N 3/08 73/159 |
| 2015/0377754 A1 * | 12/2015 | Kanade .................... G01N 3/02 73/788 |

FOREIGN PATENT DOCUMENTS

| CN | 106896022 A | 6/2017 |
| CN | 113600258 A | 11/2021 |
| JP | 2000-314690 A | 11/2000 |
| JP | 2004-257853 A | 9/2004 |
| JP | 2006-214795 A | 8/2006 |
| KR | 10-2016-0003331 A | 1/2016 |
| KR | 10-1764681 B1 | 8/2017 |
| KR | 10-2020-0138862 A | 12/2020 |
| KR | 10-2198544 B1 | 1/2021 |
| WO | WO2018065903 * | 4/2018 |

* cited by examiner

*Primary Examiner* — Jamel E Williams
*Assistant Examiner* — Alex T Devito
(74) *Attorney, Agent, or Firm* — United One Law Group LLC; Kongsik Kim; Jhongwoo Peck

(57) ABSTRACT

A sample stretch test device includes a setup table and grip modules arranged with regular intervals along an edge of a virtual arrangement circle around a center of the setup table and configured to grip a sample to be tested, and further includes at least any one of grip driving modules coupled to the setup table and configured to slide the grip modules along normals of the virtual arrangement circle in a horizontal direction parallel with the sample, and a pressing module disposed under the setup table and configured to press the sample in a vertical direction perpendicular to the sample.

15 Claims, 7 Drawing Sheets

SAMPLE STRETCH TEST DEVICE AND SAMPLE STRECH TEST SYSTEM INCLUDING SAME

CROSS REFERENCE TO RELATED APPLICATION

The present application claims priority to Korean Patent Application No. 10-2022-0012125, filed Jan. 27, 2022, which is incorporated herein by reference in its entirety.

BACKGROUND

1. Field of the Invention

The present disclosure relates to a sample stretch test device and a stretch test system including the sample stretch test device. More particularly, the present disclosure relates to a sample stretch test device that keeps repeatability of fixing a sample stable, applies tensile stress to a sample in any one of a horizontal direction and a vertical direction of the sample, and quantitatively measures and monitors tensile stress in consideration of orientation of the sample, and a sample stretch test system including the stretch test device.

2. Description of the Related Art

In general, a flexible film (hereafter, briefly referred to as "sample") means a flexible substrate that is used for manufacturing a touch screen, a display, a hybrid, a power generation film equipped with a piezoelectric device, etc., and particularly, a coating, that is, various thin substances such as an Indium Tin Oxide (ITO), a Transparent Conductive Oxide (TCO), and metal are applied to the surface thereof through deposition so that the structural and electrical inherent properties of the film can be given.

Sample test methods of the related art can be classified into a structural characteristic test based on application of physical stress, and an electrical characteristic test.

The structural test method can test whether a sample has been damaged or broken by tapping or pressing a predetermined position of the sample with a metal rod, a metal pin, or a finger for a predetermined time. Further, it is possible to set a load, which is measured when an examiner taps or presses a sample on an electronic balance, a reference or a condition for sample test and reflect the load to the test result of the sample.

However, since the structural characteristic test method of the related art is a simple method that is randomly performed without accuracy of physical stress, which is applied to a sample, secured, the test itself is meaningless. Further, even if a test result of a specific value is obtained through a test for a predetermined time, certainty and precision of the test result are remarkably low, so reliability cannot be secured. Further, there is a problem of miswriting or misjudgment such that different test result may be derived from the same sample due to variation of conditions such as an examiner or a tool.

The electrical characteristic test method can test an electrical energy characteristic that is generated from a sample when physical stress is applied to the sample in the same way described above through an electrical detector (oscilloscope) connected to the sample.

However, since the electrical characteristic test method of the related art, as described above, performs a test without accuracy of physical stress secured, certainty and precision of the test result are remarkably low, so reliability cannot be secured, it is impossible to precisely test the electrical characteristic, which changes sensitively to variation of conditions such as an examiner or a tool, and the method may be limited to simply testing whether electrical energy is generated.

DOCUMENTS OF RELATED ART

Patent Documents (Patent document 1) Korean Patent Application Publication No. 10-2016-0003331 (published on Jan. 8, 2016, title: Extending tool of sheet-like material)
(Patent document 2) Korean Patent No. 10-1764681 (published on Aug. 3, 2017, title: Flexible film test method)

SUMMARY

The present disclosure has been made in an effort to solve the problems of the related art and an objective of the present disclosure is to provide a sample stretch test device that keeps repeatability of fixing a sample stable, applies tensile stress to a sample in any one of a horizontal direction and a vertical direction of the sample, and quantitatively measures and monitors tensile stress in consideration of orientation of the sample, and a sample stretch test system including the sample stretch test device.

In order to achieve the objectives of the present disclosure, according to an embodiment of the present disclosure, a sample stretch test device includes: a setup table; and grip modules arranged with regular intervals along an edge of a virtual arrangement circle around a center of the setup table and configured to grip a sample to be tested, and further includes at least any one of grip driving modules coupled to the setup table and configured to slide the grip modules along normals of the virtual arrangement circle in a horizontal direction parallel with the sample, and a pressing module disposed under the setup table and configured to press the sample in a vertical direction perpendicular to the sample.

The grip module may include: a grip base block coupled to the setup table; a grip switching bracket rotatably coupled to the grip base block; a grip pivot bracket rotatably coupled to the grip switching bracket to grip the sample; and a grip adjustment member configured to enable the grip pivot bracket to maintain a gripped state of a sample seated on the grip base block.

The grip module may further include at least any one of: a grip pressure sensing unit configured to sense pressure that is applied to the sample when the grip pivot bracket grips the sample; a grip bracket configured to couple the grip base block to the setup table; a grip block coupled to the grip base block to be detachably coupled to the grip driving module; a test load sensing unit configured to sense a load that is applied to the sample in accordance with operation of at least any one of the grip driving module and the pressing module is operated; and a switching stop block configured to fix the grip switching bracket to the grip base block when the grip pivot bracket presses the sample.

A grip connection protrusion may be formed at any one of the grip module and the grip driving module, and a grip connection groove in which the grip connection protrusion is fitted may be recessed on or formed through a remaining one of the grip module and the grip driving module.

The grip modules may be slidably coupled to the setup table, and the grip driving module may include: a grip reciprocation block for coupling to the grip module; and a grip reciprocating unit configured to slide the grip reciprocation block.

The grip driving module may further include: an extension limit sensing unit configured to sense a maximum movement limit of the grip module moving away from the center of the setup table; and a grip default sensing unit configured to sense an initial position of the grip module moving away from the center of the setup table, and a grip restriction switch configured to operate any one of the extension limit sensing unit and the grip default sensing unit may be disposed at the grip reciprocation block.

The grip reciprocating unit may include: a grip driving member configured to generate rotation force for sliding the grip module; and a reciprocation transmission member configured to receive the rotation force and slide the grip reciprocation block.

The sample stretch test device may further include the grip driving module further includes a grip driving support unit coupled to the setup table, and the reciprocation transmission member may include: a grip driving roller configured to be rotated by rotation force on the grip driving support unit; a grip driven roller spaced apart from the grip driving roller and rotatably coupled to the grip driving support unit; and a grip driving belt forming an endless track, circumscribed on the grip driving roller and the grip driven roller, and coupled to the grip reciprocation block.

The pressing module may include: a pressing support body spaced under the setup table; a pressing member spaced over the pressing support body to press a sample gripped by the grip module; a pressing lift member coupled to the pressing support body to be movable up and down; a pressing driving module configured to move up and down the pressing lift member.

The pressing lift member may include three pressing lift members provided and spaced apart from each other, and the pressing module may further include a pressing link member having a first end linked to the pressing lift member and a second end linked to the pressing member.

The pressing driving module may include: a pressing driving member configured to generate rotation force for moving up/down the pressing lift member; a driving screw member configured to be rotated by rotation force of the pressing driving member; and a driving nut member thread-fastened to the driving screw member while being coupled to the pressing lift member.

The pressing driving module may further include: a rise limit sensing unit configured to sense a maximum rise limit of the pressing member; and a drop limit sensing unit configured to sense an initial position of the pressing member, and the driving nut member may include a lift switch configured to operate any one of the rise limit sensing unit and the drop limit sensing unit.

The pressing module may further include a lift guide member configured to guide up-down movement of the driving nut member.

A sample stretch test system according to the present disclosure include: a body having a test space for testing a sample; and a test unit disposed in the test space and configured to perform at least any one of operation of stretching a sample, which is gripped, in a horizontal direction parallel with the sample and operation of pressing the sample in a vertical direction perpendicular to the sample, in which the test unit includes the sample stretch test device according to the preset disclosure.

The sample stretch test system may further include: an imaging unit spaced upward apart from the test unit in the test space; a lighting unit configured to emit light toward the sample; and a control unit configured to control operation of the test unit.

According to the sample stretch test device described above and the sample stretch test system including the sample stretch test device, it is possible to keep repeatability of fixing a sample stable, apply tensile stress to a sample in any one of a horizontal direction and a vertical direction of the sample, and quantitatively measure and monitor tensile stress in consideration of orientation of the sample. In more detail, since the components of a sample are stretched in a machine-direction (MD) and a transverse-direction (TD) in the process of manufacturing the sample, it is possible to quantitatively measure and monitor tensile stress considering orientation of the sample.

Further, through the detailed coupling relationship of the test unit, it is possible to perform a horizontal stretch test on a sample using the grip driving module and to perform a vertical stretch test on the sample using the pressing module.

Further, through the detailed coupling relationship of the grip module, the grip module can simply grip the edge of a sample.

Further, through the additional coupling relationship of the grip pressure sensing unit of the grip module, when gripping a sample, it is possible to precisely measure generated pressure and prevent the sample from being damaged or broken by the pressure for gripping the sample.

Further, through the additional coupling relationship of the grip brackets of the grip modules, it is possible to arrange several grip modules with regular intervals on the setup table and to individually maintain the grip modules.

Further, through the additional coupling relationship of the grip blocks of the grip modules, it is possible to simply attach/detach the grip driving module and the grip base block and to individually maintain the grip modules. Further, through the detailed coupling relationship of the grip block, it is possible to stably couple the test load sensing unit to the grip base block. Further, through the detailed coupling relationship of the grip block, it is possible to make the sliding coupling structure of the grip module definite at the setup table or the grip bracket.

Further, through the additional coupling relationship of the test load sensing unit at the grip module, when a sample is stretched, it is possible to precisely measure a generated load and achieve tensile stress according to stretch of the sample on the basis of the measured load.

Further, through the additional coupling relationship of the switching stop block at the grip module, it is possible to prevent rotation of the grip switching bracket on the grip base block, stably maintain the force that grips a sample by the grip module, and prevent a sample S from separating from the grip module. Further, it is possible to improve the coupling force of the switching stop block at the grip base block and the grip switching bracket.

Further, through the detailed coupling relationship of the grip driving module, it is possible to enable the grip module to smoothly slide in accordance with the operation of the grip reciprocating unit at the setup table or the grip bracket.

Further, it is possible to enable the grip reciprocation block to smoothly slide at the grip driving module.

Further, it is possible to make attachment/detachment between the grip reciprocation block and the grip connection block of the grip module definite, and it is possible to individually maintain the grip module and the grip driving module.

Further, it is possible to simply couple the grip reciprocation block to the reciprocation transmission member through the member coupling portion.

Further, through the reciprocation sensing unit, it is possible to make the initial position of the grip module definite, prevent excessive sliding of the grip module, and prevent a sample from being unexpectedly broken.

Further, through the detailed coupling relationship of the grip reciprocating unit, it is possible to simply slide the grip module using rotation force of the grip driving member.

Further, through the detailed coupling relationship of the reciprocation transmission member, it is possible to achieve a straight motion using rotation force generated by the grip driving member and enable the grip module to smoothly slide.

Further, through the detailed coupling relationship of the pressing module, it is possible to simply press the center of a sample in accordance with the operation of the pressing driving module under the sample.

Further, through the detailed coupling relationship of the pressing body, it is possible to couple not only the pressing member, the pressing lift member, and the pressing driving module, but the lift guide member in position.

Further, through the coupling relationship of the pressing link member at the pressing module, it is possible to variously change the position at which the pressing member presses a sample under the sample.

Further, through the detailed coupling relationship of the pressing driving module, it is possible to simply move up and down the pressing member using rotation force of the pressing driving member.

Further, through the lift sensing unit, it is possible to make the initial position of the pressing member definite, prevent excessive up-down movement of the pressing member, and prevent a sample from being unexpectedly broken.

Further, through the additional coupling relationship of the lift guide member, it is possible to make up-down movement of the pressing nut member definite and set the lift sensing unit in position.

Further, through the additional coupling relationship of the imaging unit, it is possible to obtain and keep the state of a sample in an image.

Further, through the additional coupling relationship of the lighting unit, it is possible to make an obtained image clear and definite.

Further, through the control unit, it is possible to stabilize the operation of the test unit, monitor state variation of a sample, enable a worker to check the operation state of the system in at least any one of a visual type and an aural type in cooperation with the test unit, and simply input information for a stretch test of a sample.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION

Hereafter, an embodiment of a sample stretch test device according to the present disclosure and a sample stretch test system including the sample stretch test device is described with reference to the accompanying drawings. However, the present disclosure is not restricted or limited by the embodiment of the present disclosure. In the following description of the present disclosure, well-known functions or configurations may not be described in detail to make the subject of the present disclosure clear.

Referring to FIGS. 1 to 7, a sample stretch test system according to an embodiment of the present disclosure include a body 10 and a test unit 20 and may further include at least any one of an imaging unit 60, a lighting unit 70, and a control unit 80.

Figure 1:
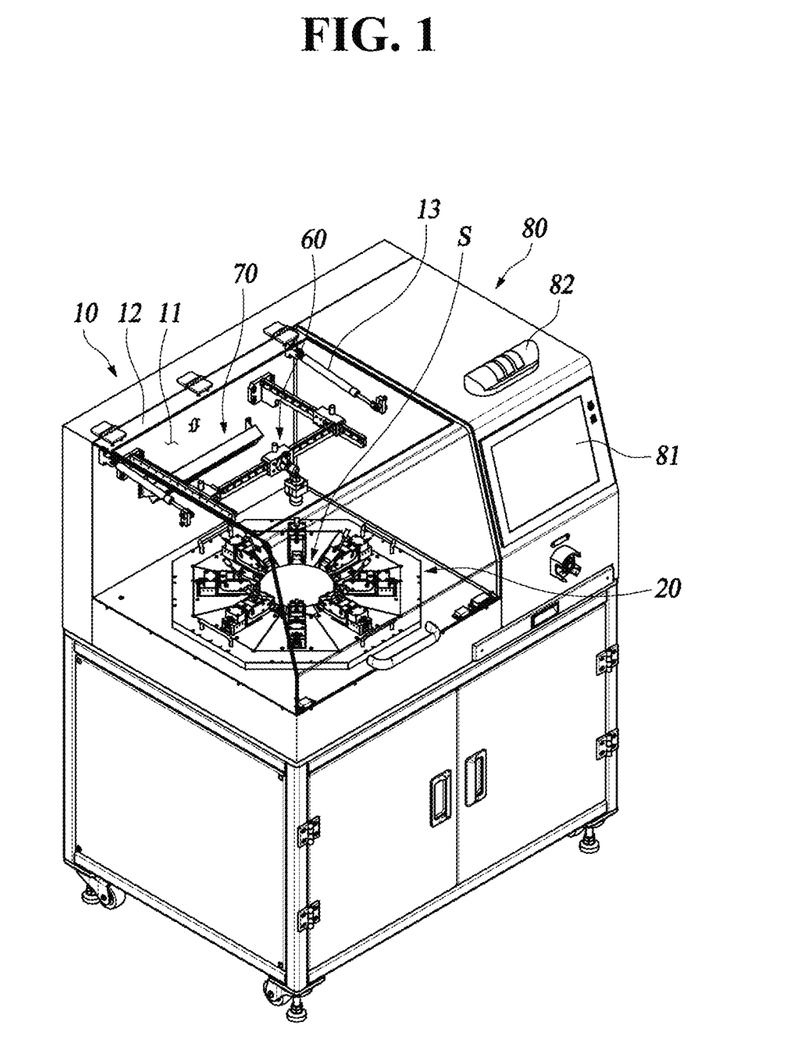
FIG. 1 is a perspective view showing a sample stretch test system according to an embodiment of the present disclosure.

The body 10 forms the external shape of the sample stretch test system.

A test space 11 for testing a sample S is formed in the body 10.

The body 10 may have a space door 12 for opening/closing the test space 11.

The body 10 may have a door damper 13 that supports the space door 12 to be able to attenuate shock in response to opening/closing of the test space 11. A side of the door damper 13 is coupled to the body 10 in the test space 11 and another side of the door damper 13 is coupled to the space door 12 in the test space 11.

The body 10 may have an emergency stop button 14 for stopping the test unit 20 in an emergency.

The body 10 may have a slidable drawer 15 in which an input module of the control unit 80 is disposed. The drawer 15 can be separated from the body 10.

The test unit 20 is disposed at the lower portion in the test space 11. The test unit 20 performs at least any one of the operation of stretching a sample S, which is gripped, in a horizontal direction parallel with the sample S and the operation of pressing the sample S in a vertical direction perpendicular to the sample S. The test unit 20 may include a sample stretch test device according to an embodiment of the present disclosure. The sample stretch test device according to an embodiment of the present disclosure will be described in detail below.

Figure 2:
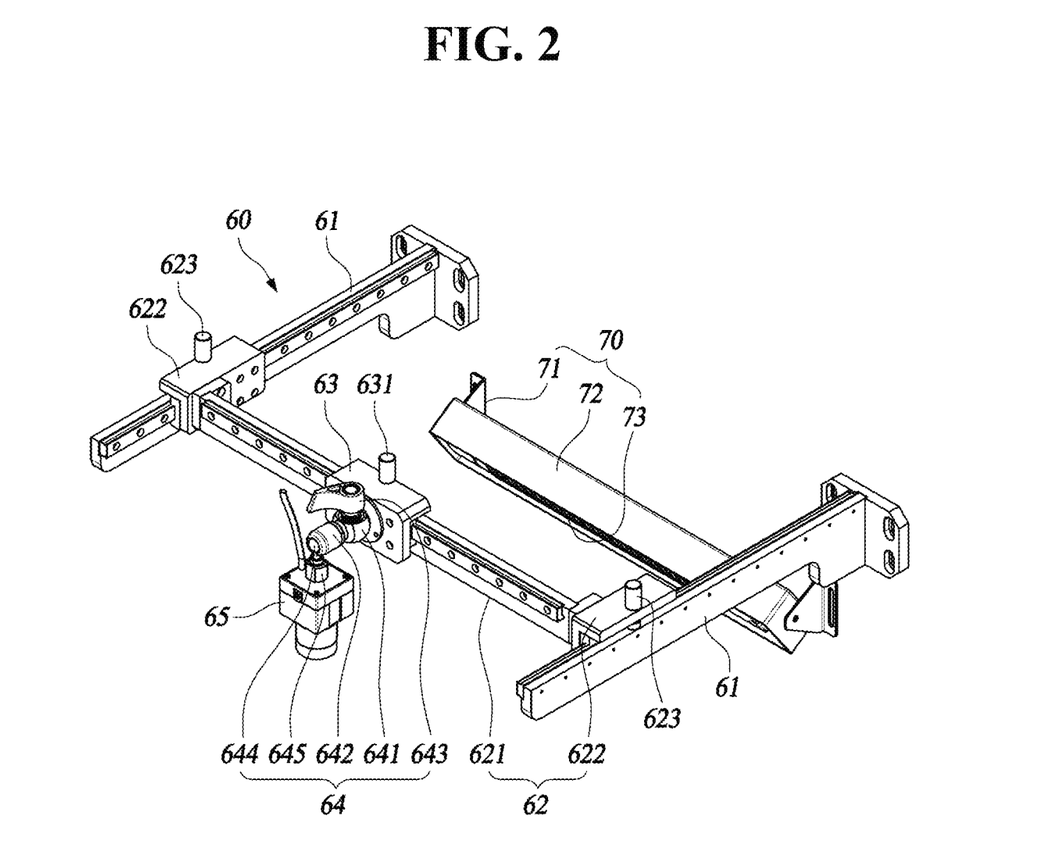
FIG. 2 is a perspective view showing an imaging unit and a lighting unit that are installed in a test space of the sample stretch test system according to an embodiment of the present disclosure.

The imaging unit 60 is spaced upward apart from the test unit 20 in the test space 11. The imaging unit 60 can image the state of a sample S in response to any one of the operation of stretching a sample S and the operation of pressing a sample S.

The imaging unit 60 may include a bracket guide 61 protruding from a side of the test space 11, a guide slider 62 slidably coupled to the bracket guide 61, an imaging slider 63 slidably coupled to the guide slider 62, a mounting block 64 coupled to the imaging slider 63, and an imaging module 65 coupled to the mounting block 64 to imaging a sample S.

The bracket guide 61 may be provided in a pair spaced apart from each other.

The guide slider 62 may include a rod guide 621 to which the imaging slider 63 is slidably coupled, and a rod slider 622 coupled to an end of the rod guide 621 and slidably coupled to the bracket guide 61. The guide slider 62 may have a front-rear fixing member 623 coupling the rod slider 622 to the bracket guide 61. For example, the front-rear fixing member 623 is thread-fastened to the rod slider 622, thereby pressing the bracket guide 61, and thus, being able to fix the rod slider 622 to the bracket guide 61.

The imaging slider 63 may have a left-right fixing member 631 coupling the imaging slider 63 to the rod guide 621 of the guide slider 62. For example, the left-right fixing member 631 is thread-fastened to the imaging slider 63, thereby pressing the rod guide 621 of the guide slider 62, and thus, being able to fix the imaging slider 63 to the rod guide 621.

The mounting block 64 may include a fixing mount 641 coupled to the imaging slider 63, a rolling adjuster 642 coupled to the fixing mount 641 to be able to roll with respect to the fixing mount 641, a rolling locker 643 fixing the rolling adjuster 643 to the fixing mount 641, and a pitching coupler 644 coupled to the rolling adjuster 642 to be able to pitch with respect to the fixing mount 641. The imaging module 65 may be coupled to an end of the pitching coupler 644. The pitching coupler 644 has an idler rotatably coupled to the rolling adjuster 642, whereby the pitching coupler 644 can roll with respect to the rolling adjuster 642. A recessed pitch-fixing portion in which the pitching coupler 644 is fitted is formed at the rolling adjuster 642, so the pitching coupler 644 can be fixed to the rolling adjuster 642 with pitching adjusted.

The mounting block 64 may further include a yawing adjuster 645 coupled to the pitching coupler 644 to be able to yaw with respect to the fixing mount. The imaging module 65 is coupled to an end of the yawing adjuster 645, so the imaging module 65 can be smoothly rotated with respect to a horizontal state of a sample S.

The lighting unit 70 emits light toward a sample S. The lighting unit 70 can emit light for imaging the state of a sample S.

The lighting unit 70 may include a lighting cover 72 coupled to a side of the body 10 and a lighting member 73 coupled to the lighting cover 72 and emitting light toward a sample S. The lighting unit 70 is coupled to a side of the body 10 and further includes a lighting bracket 71 to which the lighting cover 72 is rotatably coupled, so it is possible to adjust the emission direction of light.

The control unit 80 controls operation of at least the test unit 20 among the test unit 20, the imaging unit 60, and the lighting unit 70.

The control unit 80 may have an image display unit 81 for monitoring the state of a sample according to the operation of stretching a sample S and the operation of pressing a sample S.

The control unit 80 may have a state indicator 82 that shows in at least any one of a visual type and an aural type the operation state of the test unit 20, the operation state of the imaging unit 60, and the operation state of the lighting unit 70.

Though not shown, the control unit 80 may have an input module including a keyboard, a mouse, etc. for inputting information for a stretch test of a sample S and regulating the display state of the image display unit 81. The input module is disposed at the drawer 15 detachably coupled to the body 10, and if necessary, the drawer 15 may be separated to be exposed out of the body 10.

Figure 3:
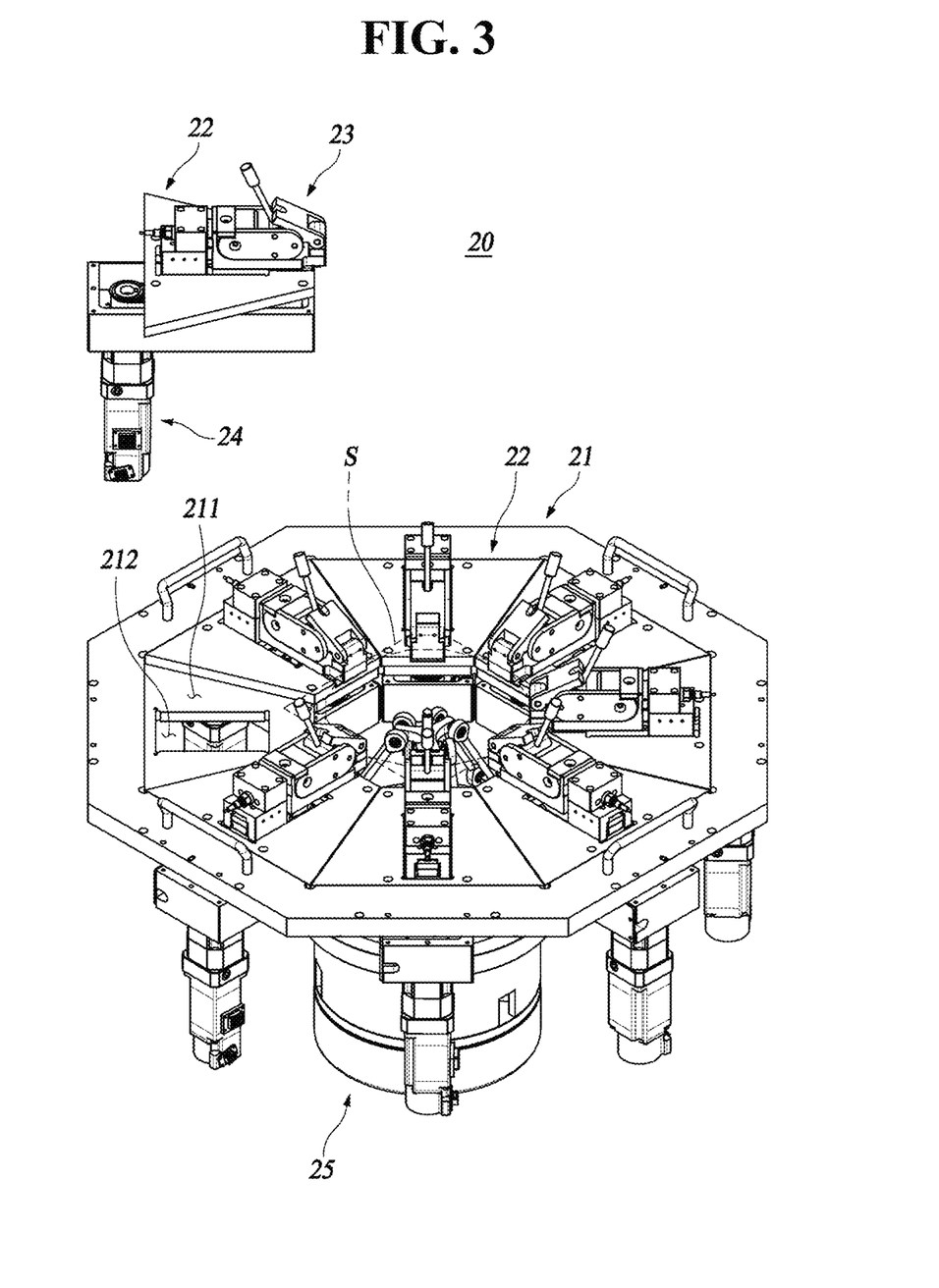
FIG. 3 is a perspective view showing a sample stretch test device according to an embodiment of the present disclosure.

Hereafter, the sample stretch test device according to an embodiment of the present disclosure is described. The sample stretch test device according to an embodiment of the present disclosure includes a setup table 21 and a grip module 23, and may further include at least any one of a grip driving module 24 and a pressing module 25.

The setup table 21 forms the floor of the test space 11.

Figure 4:
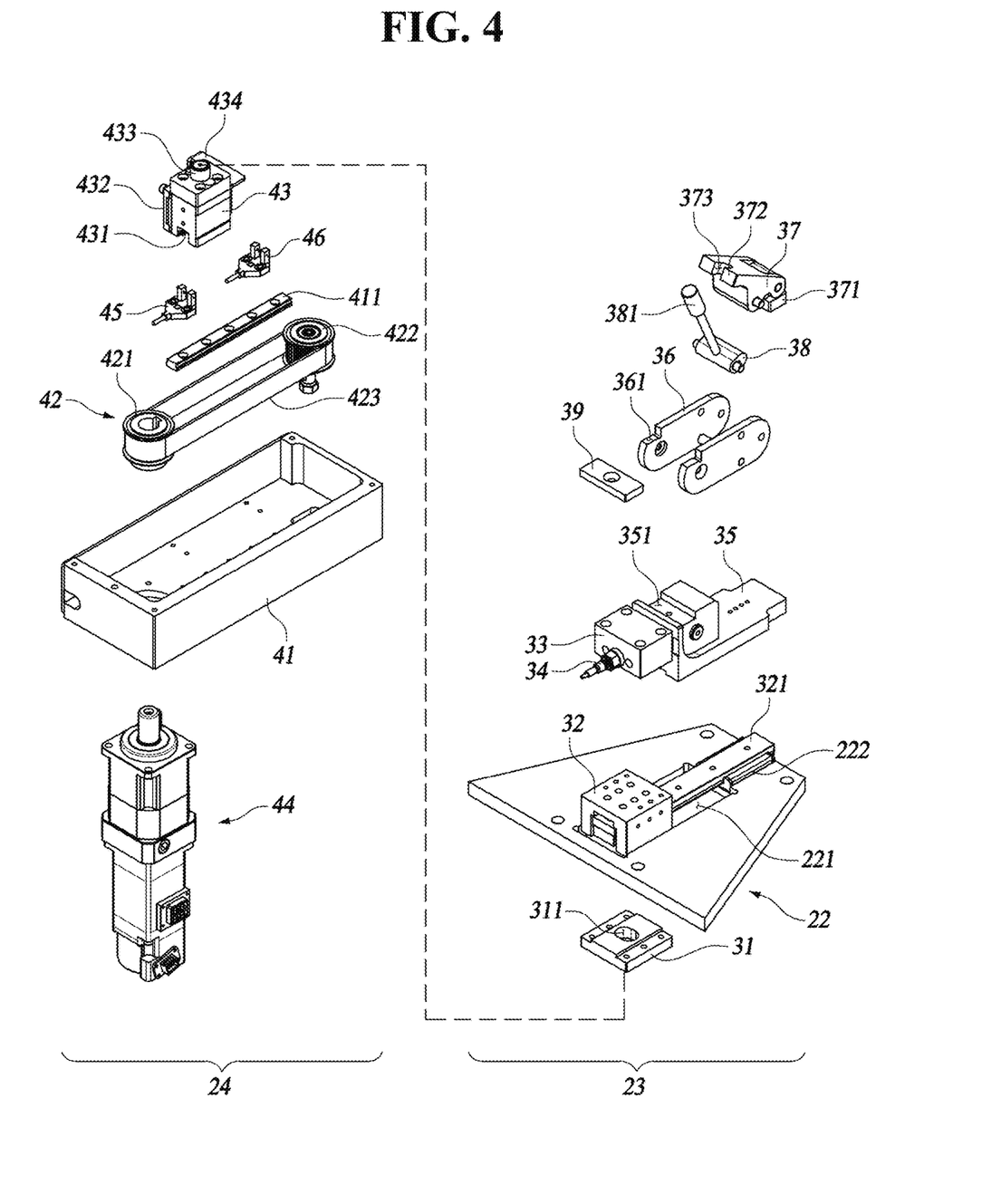
FIG. 4 is an exploded perspective view showing the coupling state of a grip bracket, a grip module, and a grip driving unit disposed on a set up table in the sample stretch test device according to an embodiment of the present disclosure.

Recessed seat grooves 211 in which the grip brackets 22 of the grip modules 23 are seated are formed at the setup table 21, so the grip modules 23 can be fixed in position.

Grip openings 212 are formed at the setup table 21, so the grip modules 23 can slide in the test space 11 and the grip driving modules 24 can be installed under the setup table 21.

The grip modules 23 are arranged with regular intervals along a virtual arrangement circle around the center of the setup table 21. At least two or more grip modules 23 may be arranged with regular intervals on the setup table 21 to be able the slide in the horizontal direction that is parallel with a sample S. In an embodiment of the present disclosure, eight grip modules 23 are disposed on the setup table 21. The grip modules 23 grip a sample S to be tested.

Figure 5:
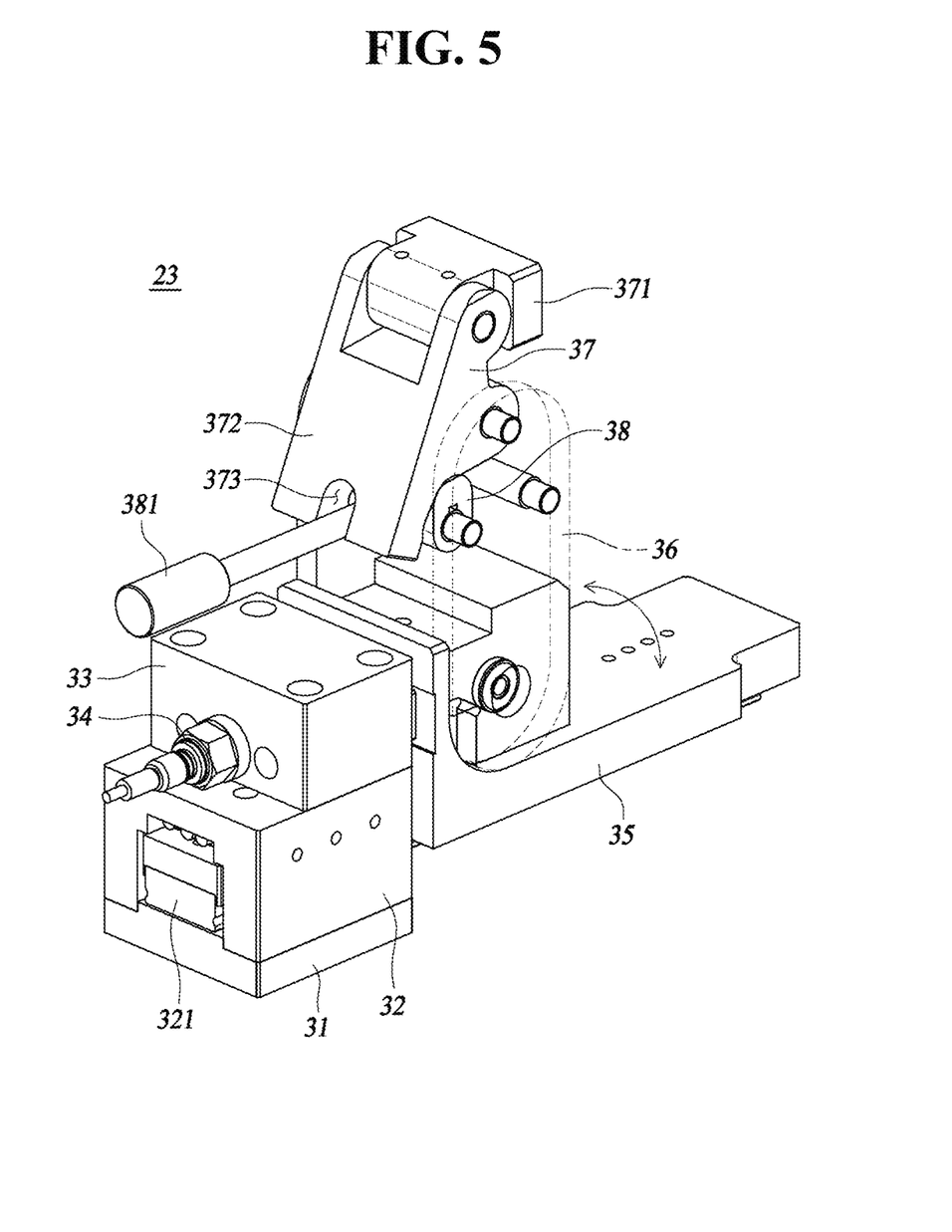
FIG. 5 is a perspective view showing an open state of the grip module for gripping a sample in the sample stretch test device according to an embodiment of the present disclosure.

The grip module 23 includes a grip base block 35 coupled to the setup table 21, a grip switching bracket 36 rotatably coupled to the grip base block 35, a grip pivot bracket 37 rotatably coupled to the grip switching bracket 36 to grip a sample S, and a grip adjustment member enabling the grip pivot bracket 37 to maintain the gripped state of a sample seated on the grip base block 35.

The grip base block 35 may have a first block coupling portion 351 that corresponds to a switching stop block 39 to be described below and to which the switching stop block 39 is detachably coupled. The grip base block 35 has a base protrusion to which the grip switching bracket 36 is rotatably coupled, and the base protrusion has a first block coupling portion 351.

A grip slider 321 may be coupled to the grip base block 35. The grip slider 321 may be coupled to the setup table 21 or the grip bracket 22.

The grip switching bracket 36 may include a pair of switching bracket members spaced apart from each other and rotatably coupled to the base protrusion of the grip base block 35, and a switching bracket rod connecting the pair of switching bracket members. Though not shown, the grip switching bracket 36 may have a channel shape. The grip switching bracket 36 may have second block coupling portions 361 to which the switching stop block 39 coupled to the first block coupling portion 351 is coupled with the grip module 23 grip a sample S.

The grip pivot bracket 37 may include a grip pivot block rotatably coupled to the grip switching bracket 36, and a sample supporting block 371 rotatably coupled to the grip pivot block to grip a sample S. Through the coupling relationship of the sample supporting block 371, the degree of freedom of the sample supporting block 371 can be secured to correspond to the thickness of a sample S and damage to a sample S due to the sample supporting block 371 can be prevented.

The grip pivot bracket 37 may further include a grip locking portion 372 to which the grip adjustment member is coupled. For example, a recessed lever seat 373 in which a pivot adjusting lever 381 of a grip adjustment cam 38 of the grip adjustment member is detachably inserted is formed at the grip locking portion 372, whereby the grip adjustment cam 38 can be smoothly rotated. As another example, a recessed lever seat 373 in which a grip adjustment threaded portion of the grip adjustment member is formed at the grip locking portion 372, so a grip adjustment knob (not shown) can stably press or release the grip locking portion 372. As another example, the grip adjustment knob (not shown) of the grip adjustment member is coupled to the grip pivot block or the grip locking portion 372, whereby the coupling relationship of the grip adjustment knob (not shown) can be made definite.

The grip adjustment member may be classified into a cam type and a knob type.

As shown in FIGS. 4 and 5, a cam-type grip adjustment member may include a grip adjustment cam 38 rotatably coupled to the grip switching bracket 36 to press the grip locking portion 372 of the grip pivot bracket 37. A camshaft forming a rotation center of the grip adjustment cam 38 may be spaced apart from a pivot shaft portion forming the rotation center of the grip pivot bracket 37. The grip adjustment cam 38 may have a grip adjustment lever 381 for grip by a user. Accordingly, when a user rotates the grip adjustment cam 38 using the grip adjustment lever 381 with the sample supporting block 371 of the grip pivot bracket 37 grip a sample S seated on the grip base block 35, the grip adjustment cam 38 presses the grip locking portion 372, the grip pivot block is rotated, and the sample supporting block 371 presses the sample S, whereby the sample S can be stably fixed in the grip module 23. On the contrary, when a user rotates the grip adjustment cam 38 backward such that the grip adjustment lever 381 is inserted into the lever seat, the pressing force applied to the sample S by the sample supporting block 371 is removed, so the sample S can be separated from the grip module 23.

Though not shown, a knob-type grip adjustment member may include a grip adjustment knob (not shown) fixing the rotary shaft portion of the grip pivot bracket 37 to the grip switching bracket 36. When the sample supporting block 371 grips a sample S, the grip adjustment knob (not show) is thread-fastened to the pivot shaft portion of the grip pivot bracket 37 outside the grip switching bracket 36, it is possible to restrict rotation of the grip pivot bracket 37 on the grip switching bracket 36 and to stably fix the sample S on the grip module 23. On the contrary, when the grip adjustment knob is loosened from the pivot shaft portion of the grip pivot bracket 37 outside the grip switching bracket 36, the grip pivot bracket 37 is freely rotated on the grip switching bracket 36 and the pressing force applied to the sample S by the sample supporting block 371 is removed, so the sample S can be separated from the grip module 23.

Though not shown, a knob-type grip adjustment member may include a grip adjustment knob (not shown) thread-fastened the grip pivot bracket 37. When the grip pivot bracket 37 grips a sample S, the grip adjustment knob (not shown) is thread-fastened to the grip pivot bracket 37 and presses the sample S, whereby the sample can be stably fixed on the grip module 23. For example, it is advantageous that the grip pivot bracket 37 is fixed to the grip switching bracket 36. As another example, the grip pivot bracket 37 is rotatably coupled to the grip switching bracket 36 and may have a pivot stopper (not shown) to restrict rotation of the grip pivot bracket 37 with respect to the grip switching bracket 36 when the grip pivot bracket 37 grips a sample S. On the contrary, when the grip adjustment knob (not shown) is loosened from the grip pivot bracket 37, the pressing force applied to the sample S by the grip adjustment knob (not shown) is removed, so the sample S can be separated from the grip module 23.

Though not shown, the knob-type grip adjustment member may include a grip adjustment shaft portion (not shown) spaced apart from the pivot shaft portion forming the rotation center of the grip pivot bracket 37 and rotatably coupled to the grip switching bracket 36, a grip adjustment threaded-portion (not shown) extending from the grip adjustment shaft portion (not shown), and a grip adjustment knob (not shown) thread-fastened to the grip adjustment threaded-portion (not shown). The grip adjustment threaded-portion (not shown) may be detachably coupled to the lever seat 373 at the grip locking portion 372 of the grip pivot bracket 37. The grip adjustment knob (not shown) may be linked to the grip pivot bracket 37 or may be provided separately from the grip pivot bracket 37. Accordingly, when the sample supporting block 371 grips a sample S, the grip adjustment knob (not show) is thread-fastened to the grip adjustment threaded-portion (not show), so it is possible to restrict rotation of the grip pivot bracket 37 on the grip switching bracket 36 and to stably fix the sample S on the grip module 23. On the contrary, when the grip adjustment threaded-portion (not shown) is loosened from the grip adjustment knob (not shown), the grip pivot bracket 37 is freely rotated on the grip switching bracket 36 and the pressing force applied to the sample S by the sample supporting block 371 is removed, so the sample S can be separated from the grip module 23.

The grip module 23 may further include at least any one of a grip pressure sensing unit (not shown) that senses pressure that is applied to a sample S when the grip pivot bracket 37 grips the sample S, a grip bracket 22 that couples the grip base block 35 to the setup table 21, a grip block that is coupled to the grip base block 35 to be detachably coupled to the grip driving module 24, a test load sensing unit 34 that senses a load that is applied to a sample S in accordance with operation of at least any one of the grip driving module 24 and the pressing module 25 is operated, and a switching stop block 39 that fixes the grip switching bracket 36 to the grip base block 35 when the grip pivot bracket 37 presses a sample S.

The grip pressure sensing unit (not shown), which senses pressure in response to the operation of gripping a sample, may be disposed at any one of the sample supporting block 371 of the grip pivot bracket 37, the grip locking portion 372 of the grip pivot bracket 37, the grip adjustment member, and the portion of the grip base block 35 at which a sample S is seated. It is advantageous that the grip pressure sensing unit (not shown) is disposed at the sample supporting block 371 of the grip pivot bracket 37 or the portion of the grip base block 35 at which a sample S is seated in order to improve measurement precision.

Any one of several grip base block 35 is coupled to the grip bracket 22 and is seated and fixed in the seat groove 211 of the setup table 21. A grip connection opening 221 may be formed through the grip bracket 22 to communicate with the grip opening 212 of the setup table 21. The grip bracket 22 may have a grip connection guide 222 forming a slide path of the grip base block 35. The grip connection guide 222 may be disposed at the setup table 21 when the grip bracket 22 is omitted. The grip connection guide 222 may be disposed at the grip base block 35.

As a result, the grip connection guide 22 forming the slide path of grip base block 34 of the grip module 23 may be disposed at any one of the setup table 21 and the grip base block 35 of the grip module 23, and the grip slider 321 that slides along the grip connection guide 222 may be disposed at a remaining one of the setup table 21 and the grip base block 35 of the grip module 23. When the grip bracket 22 is provided, the grip connection guide 22 forming the slide path of grip base block 34 of the grip module 23 may be disposed at any one of the grip bracket 22 and the grip base block 35 of the grip module 23, and the grip slider 321 that slides along the grip connection guide 222 may be disposed at a remaining one of the grip bracket 22 and the grip base block 35 of the grip module 23.

The holing block may include a grip connection block 31 detachably coupled to the grip driving module 24, and a grip sensing block connecting the grip base block 35 and the grip connection block 31 to each other. A grip connection groove 311 may be recessed on or formed through the grip connection block 31 to be coupled to a grip reciprocation block 43 of the grip driving module 24. The grip connection groove 311 may be disposed at the grip reciprocation block 43 of the grip driving module 24. A test load sensing unit 34 may be disposed at the grip sensing block 33.

The grip block may further include a grip guide block 32 coupling the grip connection block 31 to the grip sensing block 33. A grip slider 321 or a grip connection guide 222 may be coupled to the grip guide block 32.

The test load sensing unit 34 is coupled to the grip sensing block 33 of the grip block. Accordingly, when the grip sensing block 33 is pulled, the test load sensing unit 34 can measure the load that is applied to the grip base block 35.

When the test load sensing unit 34 is coupled to the grip sensing block 33 of the grip block, a grip sensing protrusion (not shown) is disposed at any one of the grip sensing block 33 and the test load sensing unit 34 and a grip sensing groove (not shown), in which the grip sensing protrusion (not shown) is slidably fitted, is disposed at a remaining one of the grip sensing block 33 and the test load sensing unit 34, so it is possible to definitely couple the test load sensing unit 34 to the grip sensing block 33 of the grip block and to simply sense a load.

The switching stop block 39 is coupled to the grip base block 35 and restricts rotation of the grip switching bracket 36. When the switching stop block 39 is coupled to first block coupling portion 351 of the grip base block 35, both ends of the switching stop block 39 are coupled to the second block coupling portion 361 of the grip switching bracket 36 and the switching stop block 39 restricts rotation of the grip switching bracket 36, so it is possible to rotation of the grip switching bracket 36 on the grip base block 35 and the grip pivot bracket 37 can stably press and fix a sample S in accordance with operation of the grip adjustment member.

The grip driving module 24 is coupled to the setup table 21. The grip driving module 24 slides the grip module 23 along a normal of a virtual arrangement circle in the horizontal direction parallel with a sample S. In this case, the grip module 23 is slidably coupled to the setup table 21 in accordance with the coupling relationship of the grip connection guide 222 and the grip slider 321.

The grip driving module 24 may include a grip reciprocation block 43 for coupling to the grip module 23, and a grip reciprocating unit that slides the grip reciprocation block 43.

The grip reciprocation block 43 is exposed through the grip opening 212 of the setup table 21. When the grip bracket 22 is provided, the grip reciprocation block 43 is exposed also through the grip connection opening 221 of the grip bracket 22 that communicates with the grip opening 212. The grip reciprocation block 43 may be slidably coupled to a grip driving support unit 41 to be described below.

The grip reciprocation block 43 may have a grip reciprocation slider 431 for sliding on the grip driving support unit 41 to be described below. The grip reciprocation slider 431 may be disposed at the grip driving support unit 41 to be described below.

The grip reciprocation block 43 may have a member coupling portion 432 detachably coupled to a reciprocation transmission member 42 of the grip reciprocating unit. The member coupling portion 432 may be coupled to a grip driving belt 423 of the reciprocation transmission member 42.

The grip reciprocation block 43 may have a grip connection protrusion 433 for coupling to the grip connection block 31 of the grip block. The grip connection protrusion 433 is fitted in the grip connection groove 311. The grip connection protrusion 433 may be disposed at the grip connection block 31.

As a result, the grip connection protrusion 433 may be formed at any one of the grip connection block 31 of the grip block and the grip reciprocation block 43, and the grip connection groove 311 in which the grip connection protrusion 433 is fitted may be recessed on or formed through the other one of the grip connection block 31 of the grip block and the grip reciprocation block 43.

A grip restriction switch 434 for operating a reciprocation sensing unit to be described below may be disposed at the grip reciprocation block 43. The grip restriction switch 434 can operate any one of an extension limit sensing unit 45 and a grip default sensing unit 46 at the reciprocation sensing unit to be described below.

The grip reciprocating unit may include a grip driving member 44 generating rotation force for sliding thee grip module 23, and a reciprocation transmission member 42 coupled to the grip driving support unit 41 to be described below and sliding the grip reciprocation block 43 using a transmitted rotation force. The reciprocation transmission member 42 may include a grip driving roller 421 that is rotated by rotation force on the grip driving support unit 41, a grip driven roller 422 spaced apart from the grip driving roller 421 and rotatably coupled to the grip driving support unit 41, and a grip driving belt 423 forming an endless track, circumscribed on the grip driving roller 421 and the grip driven roller 422, and coupled to the member coupling portion 432 of the grip reciprocation block 43.

The grip driving module 24 may further include the grip driving support unit 41 coupled to the setup table 21. The grip driving support unit 41 may have a grip reciprocation guide 411 forming a slide path of the grip reciprocation block 43. The grip reciprocation guide 411 may be disposed at the grip reciprocation block 43.

As a result, the grip reciprocation guide 411 forming the slide path of the grip reciprocation block 43 may be disposed at any one of the grip driving support unit 41 and the grip reciprocation block 43, and a grip reciprocation slider 431 sliding along the grip reciprocation guide 411 may be disposed at a remaining one of the grip driving support unit 41 and the grip reciprocation block 43.

The grip driving module 24 may further include a reciprocation sensing unit that senses a slide limit of the grip module 23. The reciprocation sensing unit may be disposed at the grip driving support unit 41. The reciprocation sensing unit may include the extension limit sensing unit 45 that senses the maximum movement limit of the grip module 23 moving away from the center of the setup table 21, and the grip default sensing unit 46 that is spaced apart from the extension limit sensing unit 45 and senses the initial position of the grip module 23 moving away from the center of the setup table 21. Accordingly, when the grip reciprocation block 43 slides, the grip restriction switch 434 operates any one of the extension limit sensing unit 45 and the grip default sensing unit 46 such that the grip reciprocating unit is stably stopped.

Figure 6:
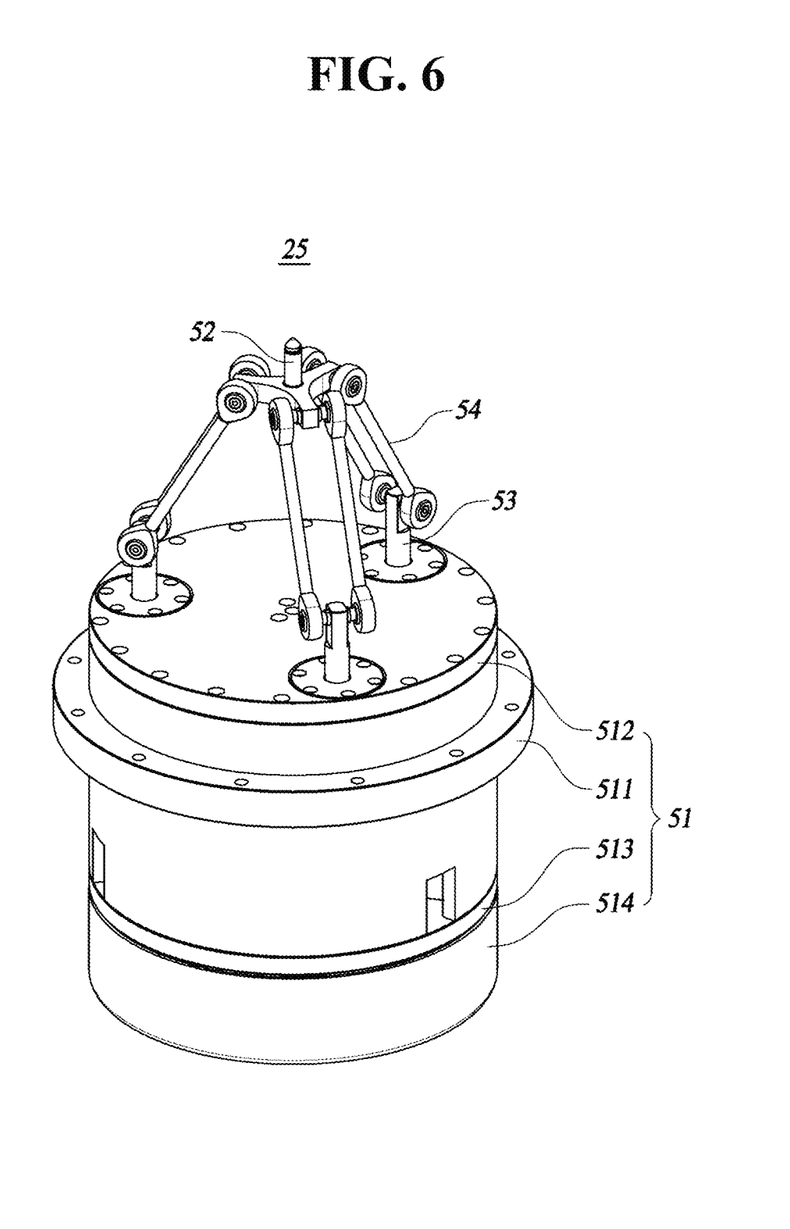
FIG. 6 is a perspective view showing a pressing module for vertically pressing a sample in the sample stretch test device according to an embodiment of the present disclosure.
Figure 7:
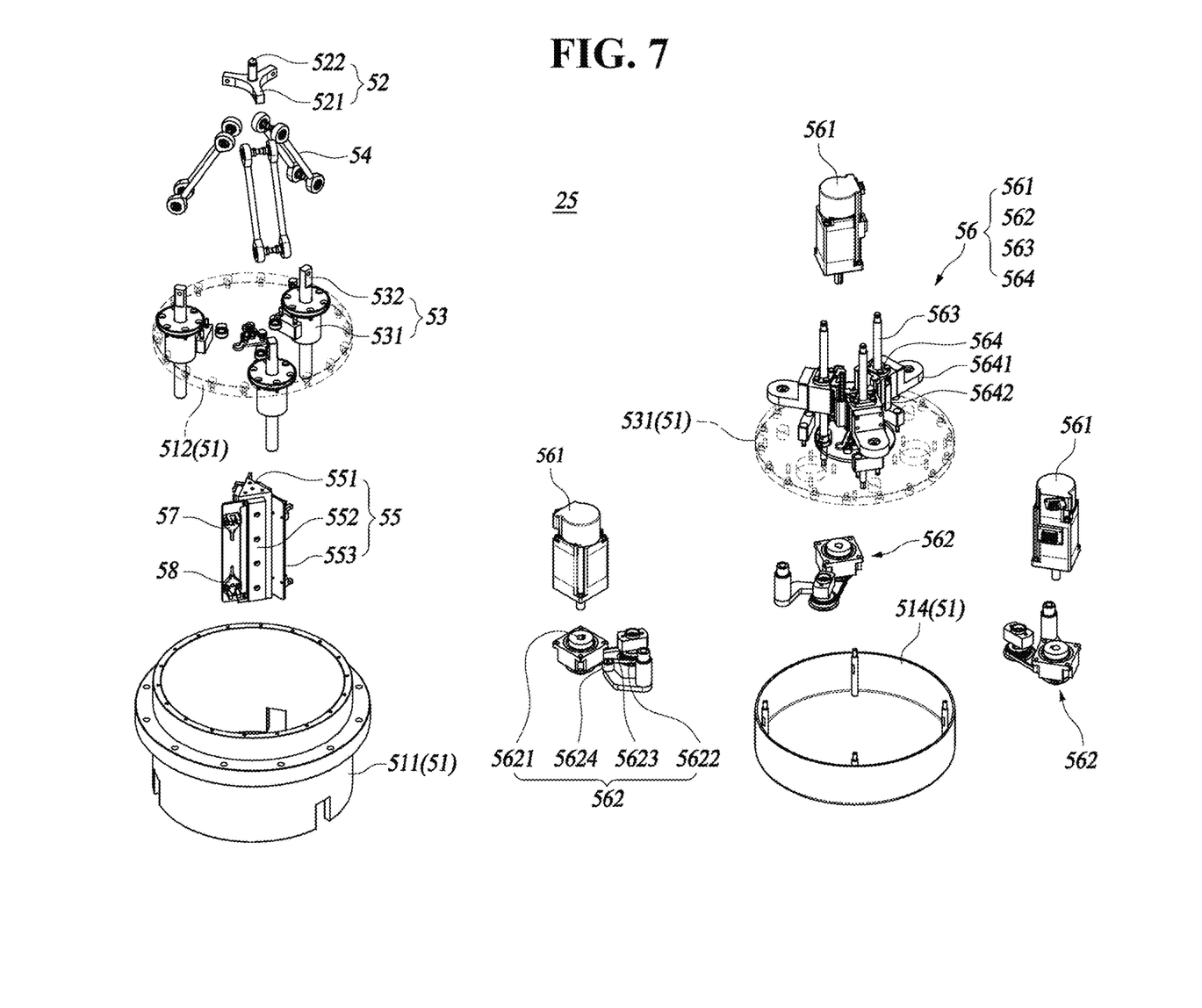
FIG. 7 is a perspective view showing the coupling state of the pressing module in the sample stretch test device according to an embodiment of the present disclosure.

The pressing module 25 is disposed under the setup table 21. The pressing module 25 presses a sample S in the vertical direction perpendicular to the sample S.

The pressing module 25 may include a pressing support body 51 spaced under the setup table 21, a pressing member 52 spaced over the pressing support body 51 to press a sample S gripped by the grip module 23, a pressing lift member 53 coupled to the pressing support body 51 to be movable up and down, and a pressing driving module 56 moving up and down the pressing lift member 53. Accordingly, as the pressing driving module 56 is operated, the pressing member 52 can vertically press a sample S.

The pressing support body 51 may include a hollow support casing 511 with open top and bottom, a top support cover 512 that is coupled to the top of the support casing 511 and to which the pressing lift member 53 is coupled, and a bottom support cover 513 that is coupled to the bottom of the support casing 511 and to which the pressing driving module 56 is coupled. The pressing support body 51 may further include a finishing cover 514 coupled to the bottom of the bottom support cover 513. The finishing cover 514 surrounds and protects the driving transmission member 562 of the pressing driving module 56.

The pressing member 52 may include a pressing bracket 521 to which the pressing lift member 53 is coupled or a pressing link member 54 to be described below is coupled, and a pressing protrusion 522 protruding toward a sample S gripped by the grip module 23 from the pressing bracket 521 to press the sample S gripped by the grip module 23.

The pressing lift member 53 may include a pressing lift guide 531 coupled to the top support cover 512 of the pressing support body 51, and a pressing lift rod 532 coupled to the pressing lift guide 531 to be movable up and down. A first end of the pressing lift rod 532 is coupled to the pressing bracket 521 of the pressing member 52 or to the pressing link member 54 to be described below. A second end of the pressing lift rod 532 is coupled to a lift coupling portion 5641 formed at a driving nut member 564.

At least three pressing lift members 53 are provided and spaced apart from each other, so the position where the pressing member 52 presses a sample S can be adjusted.

In this case, the pressing module 35 may further include three pressing link members 54 coupling the pressing lift members 53 to the pressing member 52, respectively. First ends of the pressing link members 54 are linked to the pressing lift members 53, respectively, and second ends of the pressing link members 54 are spaced apart from each other and linked to the pressing bracket of the pressing member 52.

Accordingly, as one or two pressing lift members 53 are relatively moved up or down, the position of the pressing protrusion 522 of the pressing member 52 can be changed.

The pressing driving module 56 may include a pressing driving member 561 generating rotation force for moving up/down the pressing lift member 53, a driving screw member 563 being rotated by the rotation force of the pressing driving member 561, and a driving nut member 564 thread-fastened to the driving screw member 563 while being coupled to the pressing lift member 53.

The pressing driving member 561 may be coupled to the bottom support cover 513 of the pressing support body 51. The pressing driving member 561 may be provided to one-to-one correspond to the number of the pressing lift member 53.

The driving screw member 563 may be rotatably coupled at both ends to the top support cover 512 and the bottom support cover 513. The driving screw member 563 may be provided to one-to-one correspond to the number of the pressing lift member 53. A driving thread for thread-fastening to the driving nut member 564 is formed on the outer surface of the driving screw member 563.

The driving nut member 564 may be provided to one-to-one correspond to the number of the pressing lift member 53. A nut thread for thread-fastening to the driving screw member 563 is formed on the inner surface of the driving nut member 564. The nut thread is thread-fastened to the driving thread. The driving nut member 564 may have a lift coupling portion 5641 to which the pressing lift rod 532 of the pressing lift member 53 is coupled. The driving nut member 564 may have a lift switch 5642 for operating a lift sensing unit to be described below. The lift switch 5642 can operate any one of a rise limit sensing unit 57 and a drop limit sensing unit 58 at the lift sensing unit to be described below.

The pressing driving module 56 may further include a driving transmission member 562 transmitting rotation force of the pressing driving member 561 to the driving screw member 563. The driving transmission member 562 may include a pressing driving roller 5621 being rotated by rotation force at the pressing support body 51, a pressing driven roller 5622 spaced apart from the pressing driving roller 5621 and rotatably coupled to the pressing support body 51, and a pressing driving belt 5623 forming an endless track and circumscribed on the pressing driving roller 5621 and the pressing driven roller 5622. The driving transmission member 562 is rotatably coupled to the bottom support cover 513 of the pressing support body 51 and further includes a belt pressing portion 5624, so it is possible to keep the tension of the pressing driving belt 5623 stable and secure stability of power transmission.

The pressing driving module 56 may further include a lift sensing unit that senses a lift limit of the pressing member 52. The lift sensing unit may be disposed at the lift guide member 55 to be described below. The lift sensing unit may include a rise limit sensing unit 57 that senses a maximum rise limit of the pressing member 52 and a drop limit sensing unit 58 that senses the initial position of the pressing member 52. Accordingly, when the pressing member 52, the pressing lift member 53, or the pressing nut member is moved up and down, the lift switch 5642 operates any one of the rise limit sensing unit 57 and the drop limit sensing unit 58 such that the pressing driving module 56 is stably stopped.

The pressing module 25 may further include a lift guide member 55 that guides up-down movement of the driving nut member 564. The lift guide member 55 may include a lift column 551 supported by the pressing support body 51, and a driving lift guide 552 coupled to the lift column 551 and forming an up-down movement path of the driving nut member 562. The lift guide member 55 further includes a sensing unit installation bracket 553, so the lift sensing unit can be simply installed on the lift guide member 55.

Hereafter, the operation of the sample stretch test system according to an embodiment of the present disclosure is described.

The test space 11 is opened by moving the space door 12. As shown in FIG. 5, the grip pivot bracket 37 is moved away from the grip base block 35 and then a sample S is seated on the grip module 23 such that the edge of the sample S is supported by the grip base block 35. Then, the grip pivot bracket 37 supports the edge of the sample S by rotation of the grip switching bracket 36, the grip switching bracket 36 is fixed by coupling the switching stop block 39, and then the sample S is fixed on the grip module 23 by operating the grip adjustment module.

When at least any one of the grip driving module 24 and the pressing module 25 is operated, at least any one of the operation of horizontally stretching the sample S and the operation of vertically pressing the sample S can be achieved.

In this process, the imaging unit 60 can image the stretched state of the sample S and the lighting unit 70 can emit light to the sample S.

The control unit 80 controls operation of at least the test unit 20 among the test unit 20, the imaging unit 60, and the lighting unit 70.

In this case, tensile stress is generated in the sample S in response to the stretched state of the sample S and the test load sensing unit 34 can measure a load applied to the sample S in response to the tensile stress.

The load measured by the test load sensing unit 34 is analyzed by the control unit 80, whereby it is possible to test the stretched state of the sample S.

According to the sample stretch test device described above and the sample stretch test system including the sample stretch test device, it is possible to keep repeatability of fixing a sample S stable, apply tensile stress to a sample in any one of a horizontal direction and a vertical direction of the sample S, and quantitatively measure and monitor tensile stress in consideration of orientation of the sample S. In more detail, since the components of a sample S are stretched in a machine-direction (MD) and a transverse-direction (TD) in the process of manufacturing the sample S, it is possible to quantitatively measure and monitor tensile stress considering orientation of the sample S.

Further, through the detailed coupling relationship of the test unit 20, it is possible to perform a horizontal stretch test on a sample S using the grip driving module 24 and to perform a vertical stretch test on the sample S using the pressing module 25.

Further, through the detailed coupling relationship of the grip module 23, the grip module 23 can simply grip the edge of a sample S.

Further, through the additional coupling relationship of the grip pressure sensing unit (not shown) of the grip module 23, when gripping a sample S, it is possible to precisely measure generated pressure and prevent the sample S from being damaged or broken by the pressure for gripping the sample S.

Further, through the additional coupling relationship of the grip brackets 22 of the grip modules 23, it is possible to arrange several grip modules 23 with regular intervals on the setup table 21 and to individually maintain the grip modules 23.

Further, through the additional coupling relationship of the grip blocks of the grip modules 23, it is possible to simply attach/detach the grip driving module 24 and the grip base block 35 and to individually maintain the grip modules 23. Further, through the detailed coupling relationship of the grip block, it is possible to stably couple the test load sensing unit 34 to the grip base block 35. Further, through the detailed coupling relationship of the grip block, it is possible to make the sliding coupling structure of the grip module 23 definite at the setup table 21 or the grip bracket 22.

Further, through the additional coupling relationship of the test load sensing unit 34 at the grip module 23, when a sample S is stretched, it is possible to precisely measure a generated load and achieve tensile stress according to stretch of the sample S on the basis of the measured load.

Further, through the additional coupling relationship of the switching stop block 39 at the grip module 23, it is possible to prevent rotation of the grip switching bracket 36 on the grip base block 35, stably maintain the force that grips a sample S by the grip module 23, and prevent a sample S from separating from the grip module 23. Further, it is possible to improve the coupling force of the switching stop block 39 at the grip base block 35 and the grip switching bracket 36.

Further, through the detailed coupling relationship of the grip driving module 24, it is possible to enable the grip module 23 to smoothly slide in accordance with the operation of the grip reciprocating unit at the setup table 21 or the grip bracket 22.

Further, it is possible to enable the grip reciprocation block 43 to smoothly slide at the grip driving module 24.

Further, it is possible to make attachment/detachment between the grip reciprocation block 43 and the grip connection block 31 of the grip module 23 definite, and it is possible to individually maintain the grip module 23 and the grip driving module 24.

Further, it is possible to simply couple the grip reciprocation block 43 to the reciprocation transmission member 42 through the member coupling portion 432.

Further, through the reciprocation sensing unit, it is possible to make the initial position of the grip module 23 definite, prevent excessive sliding of the grip module 23, and prevent a sample S from being unexpectedly broken.

Further, through the detailed coupling relationship of the grip reciprocating unit, it is possible to simply slide the grip module 23 using rotation force of the grip driving member 44.

Further, through the detailed coupling relationship of the reciprocation transmission member 42, it is possible to achieve a straight motion using rotation force generated by the grip driving member 44 and enable the grip module 23 to smoothly slide.

Further, through the detailed coupling relationship of the pressing module 25, it is possible to simply press the center of a sample in accordance with the operation of the pressing driving module 56 under the sample S.

Further, through the detailed coupling relationship of the pressing body, it is possible to couple not only the pressing member 52, the pressing lift member 53, and the pressing driving module 56, but the lift guide member 55 in position.

Further, through the coupling relationship of the pressing link member 54 at the pressing module 25, it is possible to variously change the position at which the pressing member 52 presses a sample S under the sample S.

Further, through the detailed coupling relationship of the pressing driving module 56, it is possible to simply move up and down the pressing member 52 using rotation force of the pressing driving member 561.

Further, through the lift sensing unit, it is possible to make the initial position of the pressing member 52 definite, prevent excessive up-down movement of the pressing member 52, and prevent a sample S from being unexpectedly broken.

Further, through the additional coupling relationship of the lift guide member 55, it is possible to make up-down movement of the pressing nut member definite and set the lift sensing unit in position.

Further, through the additional coupling relationship of the imaging unit 60, it is possible to obtain and keep the state of a sample in an image.

Further, through the additional coupling relationship of the lighting unit 70, it is possible to make an obtained image clear and definite.

Further, through the control unit 80, it is possible to stabilize the operation of the test unit 20, monitor state variation of a sample S, enables a worker to check the operation state of the system in at least any one of a visual type and an aural type in cooperation with the test unit 20, and simply input information for a stretch test of a sample S.

Although exemplary embodiments of the present disclosure were described above with reference to the drawings, the present disclosure may be changed and modified in various ways by those skilled in the art without departing from the spirit and scope of the present disclosure described in claims.

What is claimed is:

1. A sample stretch test device, comprising:
   a setup table;
   grip modules arranged with regular intervals along an edge of a virtual arrangement circle around a center of the setup table and configured to grip a sample to be tested; and
   grip driving modules coupled to the setup table and configured to slide the grip modules along normals of the virtual arrangement circle in a horizontal direction parallel with the sample,
   wherein each of the grip modules comprises:
      a grip base block coupled to the setup table;
      a grip switching bracket rotatably coupled to the grip base block;
      a grip pivot bracket rotatably coupled to the grip switching bracket to grip the sample; and
      a grip adjustment member configured to enable the grip pivot bracket to maintain a gripped state of a sample seated on the grip base block.

2. The sample stretch test device of claim 1, wherein the each of the grip modules further comprises at least any one of:
   a grip pressure sensing unit configured to sense pressure that is applied to the sample when the grip pivot bracket grips the sample;
   a grip bracket configured to couple the grip base block to the setup table;
   a grip block coupled to the grip base block to be detachably coupled to the grip driving modules;
   a test load sensing unit configured to sense a load that is applied to the sample in accordance with operation of the grip driving modules; or
   a switching stop block configured to fix the grip switching bracket to the grip base block when the grip pivot bracket presses the sample.

3. The sample stretch test device of claim 1, wherein a grip connection protrusion is formed at any one of the grip modules or the grip driving modules, and a grip connection groove in which the grip connection protrusion is fitted is recessed on or formed through a remaining one of the grip modules or the grip driving modules.

4. The sample stretch test device of claim 1, wherein the grip modules are slidably coupled to the setup table, and
   wherein each of the grip driving modules comprises:
      a grip reciprocation block for coupling to the grip modules; and
      a grip reciprocating unit configured to slide the grip reciprocation block.

5. The sample stretch test device of claim 4, wherein the each of the grip driving modules further comprises:
   an extension limit sensing unit configured to sense a maximum movement limit of the grip modules moving away from the center of the setup table;
   a grip default sensing unit configured to sense an initial position of the grip modules moving away from the center of the setup table; and
   a grip restriction switch configured to operate any one of the extension limit sensing unit or the grip default sensing unit is disposed at the grip reciprocation block.

6. The sample stretch test device of claim 4, wherein the grip reciprocating unit comprises:
   a grip driving member configured to generate rotation force for sliding the grip modules; and
   a reciprocation transmission member configured to receive the rotation force and slide the grip reciprocation block.

7. The sample stretch test device of claim 6, wherein the each of the grip driving modules further comprises a grip driving support unit coupled to the setup table, and
   wherein the reciprocation transmission member comprises:
      a grip driving roller configured to be rotated by rotation force on the grip driving support unit;
      a grip driven roller spaced apart from the grip driving roller and rotatably coupled to the grip driving support unit; and
      a grip driving belt forming an endless track, circumscribed on the grip driving roller and the grip driving roller, and coupled to the grip reciprocation block.

8. A sample stretch test system, comprising:
   a body having a test space for testing a sample; and
   a test unit disposed in the test space and configured to perform operation of stretching a sample, which is gripped, in a horizontal direction parallel with the sample,
   wherein the test unit comprises the sample stretch test device of claim 1.

9. The sample stretch test system of claim 8, further comprising at least any one of:
   an imaging unit spaced upward apart from the test unit in the test space;
   a lighting unit configured to emit light toward the sample; or
   a control unit configured to control operation of the test unit.

10. The sample stretch test system of claim 1, further comprising:
    a pressing module disposed under the setup table and configured to press the sample in a vertical direction perpendicular to the sample.

11. The sample stretch test device of claim 10, wherein the pressing module comprises:
    a pressing support body spaced under the setup table;
    a pressing member spaced over the pressing support body to press a sample gripped by the grip modules;

a pressing lift member coupled to the pressing support body to be movable up and down; and a pressing driving module configured to move up and down the pressing lift member.

12. The sample stretch test device of claim 11, wherein the pressing lift member comprises three pressing lift members provided and spaced apart from each other, and wherein the pressing module further comprises a pressing link member having a first end linked to the pressing lift member and a second end linked to the pressing member.

13. The sample stretch test device of claim 11, wherein the pressing driving module comprises:

a pressing driving member configured to generate rotation force for moving up/down the pressing lift member;

a driving screw member configured to be rotated by rotation force of the pressing driving member; and a driving nut member thread-fastened to the driving screw member while being coupled to the pressing lift member.

14. The sample stretch test device of claim 13, wherein the pressing driving module further comprises:

a rise limit sensing unit configured to sense a maximum rise limit of the pressing member; and a drop limit sensing unit configured to sense an initial position of the pressing member, and wherein the driving nut member comprises a lift switch configured to operate any one of the rise limit sensing unit or the drop limit sensing unit.

15. The sample stretch test device of claim 13, wherein the pressing module further comprises a lift guide member configured to guide up-down movement of the driving nut member.

* * * * *